United States Patent [19]

Claxton

[11] Patent Number: 5,159,989
[45] Date of Patent: Nov. 3, 1992

[54] AUTOMATIC HYDRAULIC LEVELING SYSTEM

[75] Inventor: Gerald L. Claxton, Fresno, Calif.

[73] Assignee: Up-Right International Manufacturing, Ltd., Selma, Calif.

[21] Appl. No.: 773,507

[22] Filed: Oct. 9, 1991

[51] Int. Cl.$^5$ ............................................. B60G 21/00
[52] U.S. Cl. ........................................... 180/41; 182/2; 182/19; 182/63; 187/9 R; 254/9 C; 280/6.1; 280/DIG. 1
[58] Field of Search .................. 180/41; 280/840, 6.1, 280/6.11, 6.12, DIG. 1, 766.1; 257/45, 9 C; 187/9 R; 212/189, 154; 182/2, 63, 19

[56] References Cited

U.S. PATENT DOCUMENTS

| 4,142,710 | 3/1979 | Okunda | 280/6.1 |
| 4,679,489 | 7/1987 | Sasinski et al. | 280/6.1 |
| 4,746,133 | 5/1988 | Manser et al. | 180/41 |

Primary Examiner—Kenneth R. Rice
Attorney, Agent, or Firm—Phillips, Moore, Lempio & Finley

[57] ABSTRACT

An automatic leveling system for a four-wheel vehicle system having outrigger assemblies at each of the four corners of the vehicle chassis and in which each outrigger assembly has an outrigger pad and a hydraulic cylinder for moving the pad downwardly and upwardly relative to the ground. The leveling system includes a low-pressure high-flow source of hydraulic fluid which is connected for one-way flow into the head ends of all four of the cylinders to lower all pads to the ground and then maintain them in contact with the ground. A level sensor senses the relative levelness of the right front and left rear corners of the vehicle and high-pressure low-flow hydraulic fluid is connected to the head end of the cylinder at the lower of those two corners to raise that corner of the vehicle relative to the ground. Likewise, another level sensor senses the relative levelness of the left front and right rear vehicle corners and the high-pressure low-flow hydraulic fluid is connected to the head end of the cylinder at the lower of those two corners to raise that corner of the vehicle relative to the ground.

13 Claims, 3 Drawing Sheets

AUTOMATIC HYDRAULIC LEVELING SYSTEM

TECHNICAL FIELD

This invention relates to leveling systems and more particularly a leveling system for use with four hydraulic outrigger cylinders.

BACKGROUND ART

Mobile aerial lift vehicles are in common use for lifting workman at a job site to a height where they can work on elevated structures. Typically, these vehicles are four-wheeled, and have an elevating assembly mounted on the vehicle chassis for raising and lowering the work platform.

In addition, these vehicles are provided with ground-engaging outriggers at each of the four corners of the chassis. Typically, the outriggers each include a hydraulic cylinder to lower or raise the outrigger pads relative to the chassis. The outriggers are used, even when the vehicle is on level ground, to rigidify the system and prevent any movement of the elevated work platform that might be caused by "bounce" of the pneumatic tires during work operations.

The outrigger system is also used to level the entire vehicle if the ground slopes at the job site, so that the work platform can be raised in a purely vertical direction. Prior to the present invention, the operator leveled the vehicle by watching the bubble, or bubbles, of a level indicator and by individually controlling the amount of extension of the four outrigger hydraulic cylinders. If the ground slopes in a single direction, two of the corners of the chassis will be lower than the uphill corners and will have to be lifted by the hydraulic cylinders at the downhill corners. If the ground slopes in two directions, three of the corners of the chassis will have to be raised to the level of the uphill corner. Since the chassis is rigid, raising of one corner of the frame will cause undesirable rocking of the vehicle about a diagonal axis through the outrigger being extended, unless the other two outrigger pads are simultaneously controlled by the operator so that they are maintained in ground contact. Manual control of the leveling process is time consuming and requires considerable operator attention.

SUMMARY OF THE INVENTION

The present invention is directed towards overcoming one or more of the problems set forth above.

In one aspect of the invention, a leveling system is provided for a vehicle with four outriggers at the corners of the chassis wherein low pressure fluid is applied to all four outrigger cylinders to move the outrigger pads to the ground and maintain them in ground contact, and wherein high pressure fluid is applied to the outrigger cylinders at the corners of the chassis which are lower than the diagonally opposite corners to raise the lower chassis corners of the vehicle relative to the ground.

Other aspects of the invention will be set forth in the course of the following detailed description.

BRIEF DESCRIPTION OF THE DRAWINGS

In the drawings, forming a part of this application, and in which like parts are designated by like numerals throughout the same.

DESCRIPTION OF THE PREFERRED EMBODIMENT

Figures 1, 2, 3:
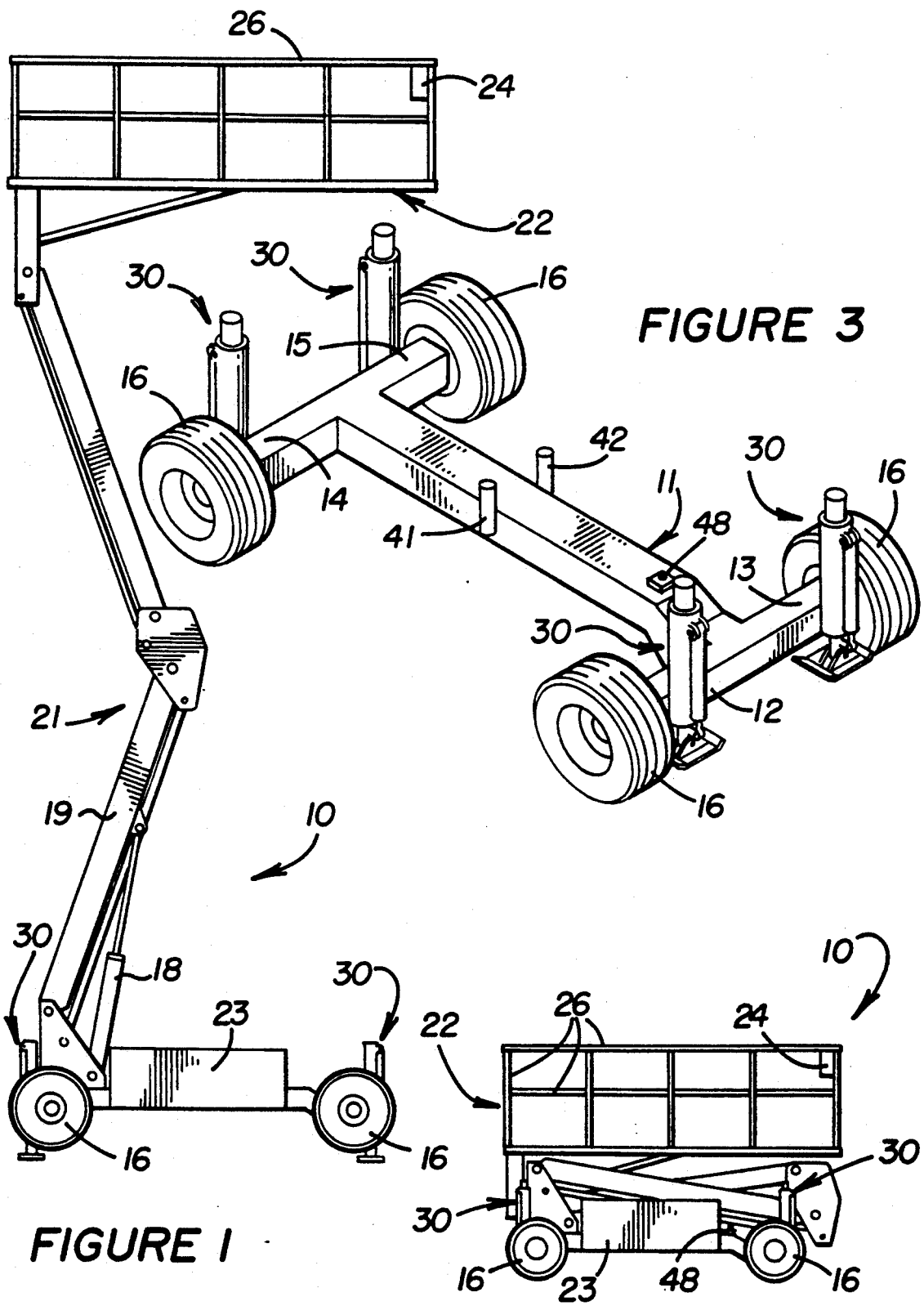
FIG. 1 is a simplified side view of a mobile aerial lift vehicle utilizing the principles of the present invention, and showing the platform in elevated position.
FIG. 2 is similar to FIG. 1, showing the platform in lowered position.
FIG. 3 is a simplified perspective view of the vehicle in FIG. 1, showing only the chassis, wheels and outrigger assemblies.

In the drawings, wherein a preferred embodiment of the invention is shown, the mobile aerial lift vehicle 10 has a generally rectangular chassis 11 with right front, left front, right rear and left rear corners 12, 13, 14 and 15 and a wheel 16 mounted at each corner of the chassis. For a two-wheel drive, each rear wheel 16 may be driven in a desired direction by a hydraulic motor 17. A hydraulic ram 18, connected between the chassis 11 and the lower boom 19 of the elevating assembly 21 is used to raise and lower the work platform 22 between the raised and lowered positions of FIGS. 1 and 2. One or more modules 23 are mounted on chassis 11 to contain the electrical and hydraulic systems of the vehicle. A control panel 24, mounted on a guard rail 26 of the work platform 22, is provided for the operator to use in driving the vehicle and in raising and lowering the platform.

Figure 4:
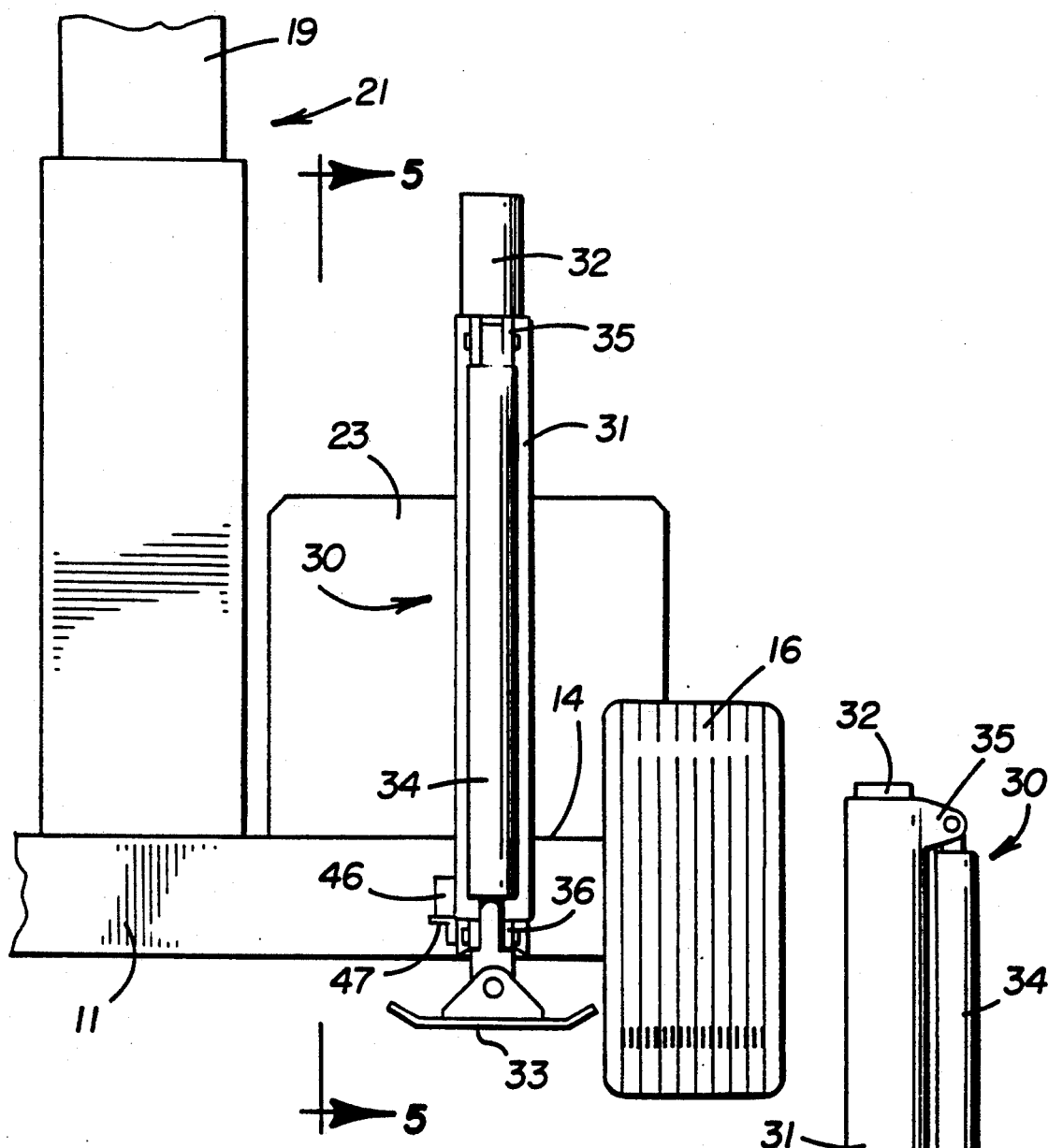
FIG. 4 is a partial rear view of the vehicle of FIG. 1 showing one of the outrigger assemblies with outrigger pad in upward retracted position.
Figure 5:
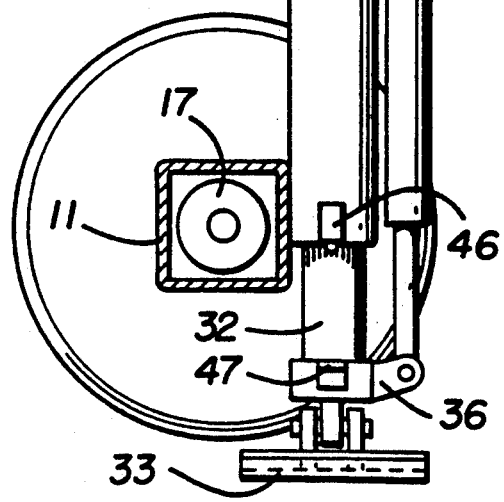
FIG. 5 is a view of the outrigger assembly of FIG. 4, taken on lines 5—5 of FIG. 4, with the outrigger pad in a downward position.

The vehicle 10 also includes an outrigger assembly 30 at each corner of the chassis. As best seen in FIGS. 3 and 4, each outrigger assembly 30 includes a generally vertical sleeve 31 welded, a otherwise fixed, to the chassis 11, a column 32 slidable in the sleeve, and an outrigger pad 33 pivotally mounted on the lower end of column 32. A double acting hydraulic ram 34 is connected between brackets 35 on sleeve 31, and collar 36 on the lower end of column 32, to lower and raise the outrigger pad 33 relative to the chassis 11.

When the vehicle is at the work site, the outrigger pads 33 are lowered into engagement with the ground so that there will be no tire bounce when work operations are carried out on the raised work platform. If the ground at the work site is not level the outrigger pads are separately adjusted so that the chassis is leveled to horizontal before raising the work platform. With the type vehicle shown herein, the outrigger pads need only engage the ground near the wheels since the elevating assembly 21 will maintain the center of gravity of the work platform well within the rectangle formed by the outrigger pads for all vertical positions of the platform. The structure described thus far is conventional.

In accordance with the present invention, a leveling system 40 is provided for automatically leveling the chassis 11 before elevating the platform 22, and for retracting the outrigger pads after the platform has been lowered. The leveling system 40 includes as part of its hardware two pendulum-type level sensors 41 and 42 which are both mounted on chassis 11, level sensor 41 being oriented so that its pendulum 43 moves in the vertical plane defined by the right front and left rear corners 12 and 15 of the vehicle to sense the relative levelness of those corners. Level sensor 42 is oriented so that its pendulum moves in the vertical plane defined by the left front and right rear corners 13 and 14 to sense the relative levelness of those corners. Each outrigger assembly 30 includes a normally-closed microswitch 46 which is engaged by bracket 47 on the column collar 36 when the outrigger pad is fully upwardly retracted. When the outrigger pad has been moved downwardly, microswitch 46 will open. Another normally-closed microswitch 48 is mounted on chassis 11 (FIG. 3) for engagement by a suitable part of the elevating assembly 21 when the platform 22 has been fully lowered. When the platform is but slightly elevated, microswitch 48 will open.

Figure 6:
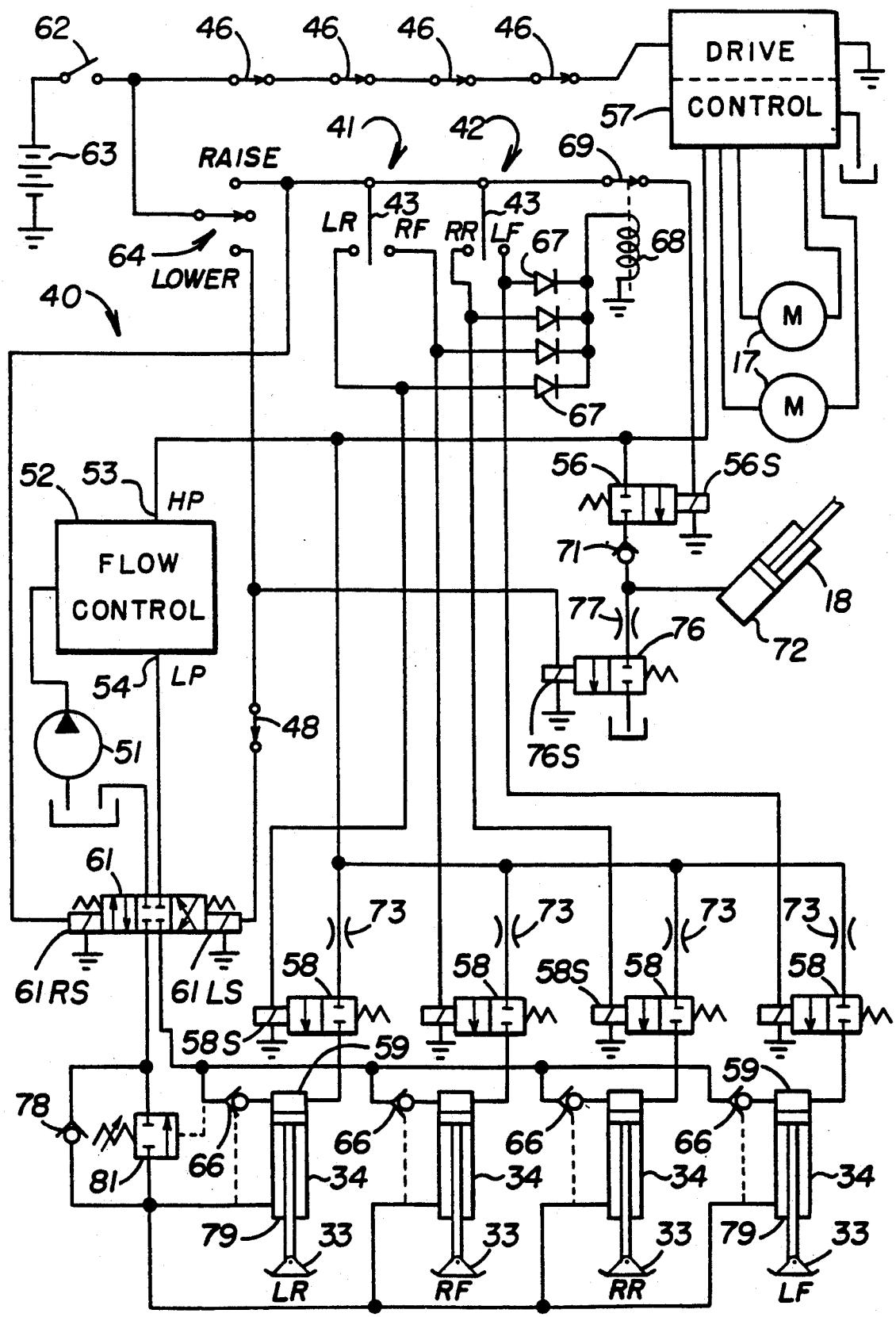
FIG. 6 is a combined diagram of the electrical and hydraulic circuits of the leveling system.

The operation of the leveling system 40 is best described with reference to FIG. 6 which shows both the hydraulic and electrical circuits for the system. With respect to the hydraulic circuit, hydraulic pump 51 delivers hydraulic fluid to flow control 52 which has a high-pressure low-flow outlet 53 and a low-pressure high-flow outlet 54. The high-pressure outlet 53 is connected to the normally-closed "Raise" solenoid valve 56 for the hydraulic ram 18, to the drive control 57 for reversible distribution to the drive motors 17, and to the normally-closed solenoid valves 58 connected individually to the head ends 59 of each of the cylinders 34 of the outrigger assemblies 30. The low-pressure high-flow outlet 54 is connected to the spring-centered three position valve 61.

In operation, closure of the main switch 62 will supply power from battery 63 to the electrical circuit of the system. With all four outrigger pads 33 fully retracted upwardly, all four microswitches 46 will be closed so that power is available to the drive control 57 to enable the vehicle to be driven.

When the vehicle is at a work site, the operator may now actuate the three position lift switch 64 to its "Raise" position. This will energize the solenoid 61RS of valve 60 to move the valve to the position connecting the low-pressure outlet 54 simultaneously to and through piloted check valves 66 to the head end 59 of each of the outrigger cylinders 34. The high flow of hydraulic fluid will quickly extend cylinders 34 so that the outrigger pads move down into ground engagement. The pressure at the low pressure outlet 54 is insufficient to cause any of the cylinders to raise the chassis 11 upwardly from the ground. Once the outrigger pads are in ground engagement they cannot move upwardly because flow from the head ends of cylinders 34 is prevented by the check valves 66. With the outriggers lowered, the microswitches 46 will open and the drive control 57 will be disabled so that the vehicle cannot be driven.

With the lift switch 64 in its "Raise" position, power will also be delivered to the pendulums 43 of level sensors 41 and 42. If the ground is level, the pendulum 43 of level sensor 41 will be between, and out of engagement with, contacts LR and RF, and the pendulum of the level sensor 42 will likewise be between its contacts RR and LF. As a consequence, no power will be supplied through diodes 67 to solenoid 68 and its associated switch 69 will be closed. This enables the solenoid 56S of valve 56 to be energized, so that high-pressure fluid is delivered through valve 56 and check valve 71 to the head end 72 of the hydraulic ram 18 so that the work platform is elevated. When the platform is at its desired height, the operator will move the lift switch 64 to its middle position. Solenoid 56S of valve 56 is deenergized and no further fluid is delivered to the ram 18.

If, however, the ground at the work site is not level, then one or both of the pendulums 43 of the level sensors 41 and 42 will engage one of their contacts. Regardless of which contact is engaged, solenoid 68 will be energized through at least one diode 67, and switch 69 will be opened to prevent ram 18 from raising the platform. If the left rear corner 15 of the vehicle is lower than the diagonally opposite right front corner 12, pendulum 43 of the level sensor 41 will engage the LR contact and the solenoid 58S of the valve 58 connected to the head end of the left rear cylinder 34 will be energized. High-pressure fluid can now flow through restrictor 73 to the head end of the left rear cylinder. If the left rear outrigger pad has not yet engaged the ground, the high and low pressure fluids will both drive the pad freely downward. Once the pad is on the ground, so that there is a high resistance to fluid flow into the cylinder, fluid will continue to flow into the cylinder through the high-pressure line until the left rear cylinder has moved the left rear corner of the vehicle up to the level of the right front corner. Most often, if the ground at the work site is not level, both level sensors 41 and 42 will indicate unlevelness. Thus, the level sensor 42 might also sense that the right rear corner 14 is lower than the left front corner 13. If so, high-pressure fluid would be delivered to the right rear cylinder 34 at the same time that high pressure fluid is being delivered to the left rear cylinder. The pressure available from the high pressure outlet 53 is, of course, sufficiently high as to enable the cylinders 34 to lift their corners of the vehicle upwardly relative to the ground.

With all four pads on the ground, and with high-pressure fluid going into one of the cylinders, for example, the left rear cylinder, that corner of the chassis will be raised relative to the ground. Since the chassis 11 is rigid, the left front and right rear corners will likewise be lifted so that one or both outriggers at those corners would be lifted off the ground. Normally, this would cause the vehicle to teeter about the axis of the two pads which are engaging the ground. However, in the present invention, whenever a pad starts to be lifted off the ground, the resistance to fluid flow into the head end of the cylinder controlling such pad decreases and allows low-pressure fluid to flow into the cylinder, driving the pad downwardly into contact with the ground. Thus, as one or two of the corners of the vehicle are elevated by the high-pressure fluid, the low-pressure fluid will maintain the other pads in contact with the ground so that the vehicle will not teeter about either diagonal axis. The flow restrictors 73 in the high-pressure lines to the head ends of the outrigger cylinders 34 will equalize flow to the demanded cylinders so that the flow into two demanded cylinders will be the same even though one of the corners of the vehicle has more weight on it than the other.

In due course, the vehicle will be leveled, and the level sensors 41 and 42 will cause valves 58 to return to a position shutting off high pressure flow to the cylinders 34. Check valves 66 prevent flow from the cylinders so that the frame 11 remains level.

With the chassis leveled, the pendulums of the level sensors 41 and 42 return to their neutral positions so that solenoid 68 is deenergized. Switch 69 closes so that the hydraulic ram 18 can be caused to lift the platform to its desired height.

To lower the platform, the lift valve 64 is moved to its "Lower" position Solenoid 76S of solenoid valve 76 is energized, and valve 76 shifts to allow fluid to flow from the hydraulic ram 18 through the flow restrictor 77 and valve 76 so that the platform can lower.

If the platform is lowered fully, microswitch 48 will close, so that solenoid 61LS of valve 61 is energized. This now connects low-pressure fluid through piloted check valve 78 to the rod ends 79 of all of the outrigger cylinders 34. This pressure at the rod ends of the cylinders will open the piloted check valves 66 at the head ends of cylinder 34 so that fluid can flow out of the head ends of all four outrigger cylinders as the outrigger pads are retracted upwardly When all outriggers are fully retracted, microswitches 46 will all close to again provide power to the drive control 57 so that the vehicle may be driven to another work site.

A piloted counterbalance valve 81 is connected in parallel with check valve 78 to allow fluid to flow from the rod ends of cylinders 34 when the head ends are pressurized by either high or low pressure fluid. Valve 81 will be piloted open if the pilot pressure in the low pressure line to check valves 66 is above a predetermined value or if the pressure in the rod end of any of the cylinders 34 is above a predetermined and higher value.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others in the art to best utilize the invention in various embodiments and with various modifications as are suited to the particular use contemplated. It is intended that the scope of the invention be defined by the claims appended hereto.

We claim:

1. A leveling system for a wheeled vehicle having generally horizontal chassis with right front, left front, right rear and left rear corners, a wheel at each of said corners, an outrigger pad at each of said corners, an extensible hydraulic cylinder at each of said corners for individually moving said pads upwardly or downwardly relative to its corner of said chassis, said hydraulic cylinders each having head and rod ends, said leveling system comprising:
   means for concurrently generating high-pressure and low-pressure hydraulic fluids,
   first fluid control means for connecting said low-pressure fluid for one-way flow to the head ends of all four of said cylinders,
   second fluid control means for connecting said high pressure fluid to the head end of said right front cylinder when the right front chassis corner is lower than the left rear chassis corner and for connecting said high-pressure fluid to the head end of said left rear cylinder when said left rear chassis corner is lower than the right front chassis corner,
   third fluid control means for connecting said high-pressure fluid to the head end of said left front cylinder when said left front chassis corner is lower than the right rear chassis corner and for connecting said high-pressure fluid to the head end of said right rear cylinder when said right rear chassis corner is lower than the left front chassis corner.

2. A leveling system as set forth in claim 1, wherein the pressure of the low pressure hydraulic fluid is sufficient to extend the cylinders to move the outriggers freely to the ground but is insufficient to enable said cylinders to raise said chassis relative to the ground, and wherein the pressure of the high-pressure hydraulic fluid is sufficient to enable the cylinders to raise the chassis relative to the ground.

3. A leveling system as set forth in claim 1, and further including:
   a switch having first and second positions,
   said first fluid control means has the function set forth in claim 1 when said switch is in its first position and includes means for preventing fluid flow from the head end of any of said cylinders when said switch is in its second position,
   said second and third fluid control means each having the function set forth in claim 1 only when said switch is in its first position.

4. A leveling system as set forth in claim 3,
   said switch having a third position,
   said first fluid control means including means for allowing fluid to flow to the rod ends of all of said cylinders and for allowing fluid to flow from the head ends of all of said cylinders when said switch is in its third position.

5. A leveling system as set forth in claim 4, wherein said vehicle has drive means for driving the vehicle, and wherein said leveling system includes means for enabling said drive means when all of said outrigger pads are upwardly retracted and for disabling said drive means when any of said outrigger pads has been moved downwardly into engagement with the ground.

6. A leveling system as set forth in claim 3, wherein said vehicle includes a work platform and means including an extensible hydraulic ram with a head end for raising and lowering said work platform relative to said chassis, said leveling system further including:
   means for connecting hydraulic fluid to the head end of said ram when said switch is in its first position and for preventing fluid flow to or from said head end of said ram when said switch is in its second position 7. A leveling system as set forth in claim 6, and further including:
   means for preventing flow of hydraulic fluid to the head end of said ram when said switch is in its first position and any of said chassis corners is lower than another corner.

8. A leveling system as set forth in claim 7, wherein said switch has a third position, and further including:
   means for allowing hydraulic fluid to flow from the head end of said ram when said switch is in its third position.

9. A leveling system as set forth in claim 3,
   wherein said second fluid control means includes a first level sensing means for sensing the relative height of said right front and left rear corners of said chassis, and means for connecting said high-pressure fluid to the head end of said right front cylinder in response to a sensing of said first level sensing means that the right front chassis corner is lower than the left rear chassis corner and for connecting said high-pressure fluid to the head end of said left rear cylinder in response to the sensing of said first level sensing means that the left rear chassis corner is lower than the right front chassis corner, wherein said third fluid control means includes a second level sensing means for sensing the relative height of said left front and right rear frame corners of said chassis, and means for connecting said high-pressure fluid to the head end of said left front cylinder in response to a sensing of said second level sensing means that the left front chassis corner is lower than the right rear chassis corner and for connecting said high-pressure fluid to the head end of said right rear cylinder in response to the sensing by said second level sensing means that the right rear chassis corner is lower than the left front chassis corner.

10. A leveling system as set forth in claim 9, wherein said vehicle includes a work platform and means including an extensible hydraulic ram with a head end for raising and lowering said work platform relative to said chassis, said leveling system further including:
means for connecting hydraulic fluid to the head end of said ram when said switch is in its first position and for preventing fluid flow to or from said head end of said ram when said switch is in its second position.

11. A leveling system as set forth in claim 10, and further including:
means for preventing flow of hydraulic fluid to the head end of said ram when said switch is in its first position and either of said first and second level sensing means senses that a corner of said chassis is lower than another corner of said chassis.

12. A leveling system as set forth in claim 11, wherein said switch has a third position, and further including:
means for allowing hydraulic fluid to flow from the head end of said ram when said switch is in its third position.

13. A leveling system as set forth in claim 12, wherein said first flow control means includes means for allowing fluid to flow to the rod ends of all of said cylinders and for allowing fluid to flow from the head ends of all of said cylinders when said switch is in its third position.

* * * * *